June 1, 1965

R. A. BROWN ETAL 3,186,790

PRODUCTION OF NITRONIUM PERCHLORATE

Filed June 22, 1960

ROBERT A. BROWN
DAVID S. FETTERMAN

*INVENTORS*

BY Donald L. Rose 3,186,790
PRODUCTION OF NITRONIUM PERCHLORATE
Robert A. Brown, Butler, and David S. Fetterman, Willow Grove, Pa., assignors to Callery Chemical Company, Pittsburgh, Pa., a corporation of Pennsylvania
Filed June 22, 1960, Ser. No. 38,074
8 Claims. (Cl. 23—14)

This invention relates to a new and improved method for producing nitronium perchlorate, $NO_2ClO_4$.

Nitronium perchlorate, $NO_2ClO_4$, is a relatively little known compound which is finding new uses in several applications wherein its oxidizing power is advantageously utilized. Previously the uses to which it was put were limited by the difficulties encountered in the known methods by which it was produced. The compound itself is an ionic white solid, stable at least up to about 120° C., which decomposes without melting at about 140° C.

The prime object of this invention is to provide a new and improved method for producing nitronium perchlorate which economically produces nitronium perchlorate of high purity in high yields.

Another object is to provide a method for producing nitronium perchlorate which provides consistency of operation and is thus applicable to commercial production on a relatively large scale.

Other objects will become apparent from time to time throughout the following specification and claims.

Figure 1:
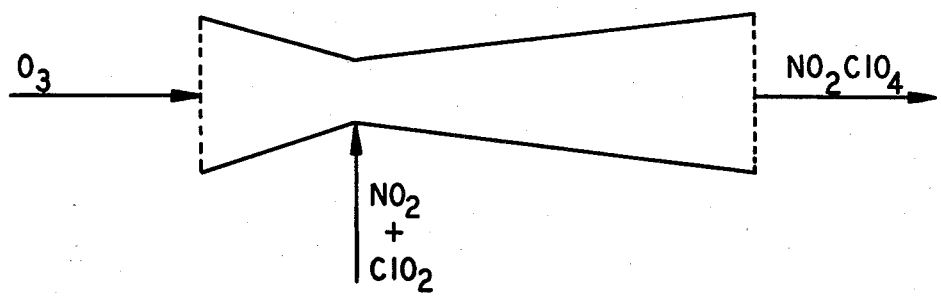

We have found, and it is upon this discovery that the present invention is in large part based, that the reaction of ozone with nitrogen dioxide, $NO_2$, and chlorine dioxide, $ClO_2$, produces nitronium perchlorate in accordance with the above objects if the reaction is carried out under certain conditions. FIGURE 1 of the drawing which is a part of this specification is a schematic sketch showing the configuration of a Venturi tube reactor suitable for use in the practice of the method of this invention; as shown, the reactor comprises two truncated cones jointed at their smaller ends by a throat. Also shown in this sketch are the preferred flow directions of the reactants. When the reaction of nitrogen dioxide and chlorine dioxide with ozone is carried out in such a reactor, nitronium perchlorate is produced instantaneously.

The basic reaction which produces the nitronium perchlorate is shown in Equation 1:

(1)  $NO_3 + ClO_3 \rightarrow NO_2ClO_4$

However, the reaction of $NO_3$ with $ClO_3$ cannot be carried out directly because $NO_3$ is unstable and apparently has only a transient existence. $ClO_3$ is also somewhat unstable. In the method of our invention, good yields are obtainable because $NO_3$ and $ClO_3$ are formed in situ, in accordance with Equations 2 and 3:

(2)  $NO_2 + O_3 \rightarrow NO_3 + O_2$ (3)  $ClO_2 + O_3 \rightarrow ClO_3 + O_2$ It is necessary to feed ozone into the reaction zone separate from the nitrogen dioxide and chlorine dioxide feeds. This is due to the reactions shown in Equations 4 and 5, which tend to dissipate $NO_3$ and $ClO_3$ and to use up the ozone as well.

(4)  $NO_3 \rightarrow NO_2 + \tfrac{1}{2}O_2$ (5)  

The particular importance of avoiding contact between the nitrogen dioxide and ozone prior to the time of reaction is emphasized by consideration of Equations 2 and 4, which demonstrate the catalytic effect of $NO_2$ in decomposing ozone to oxygen. The products formed from chlorine dioxide in the presence of ozone are of indeterminate composition, but are relatively non-volatile liquids, generally yellow, which not only consume chlorine dioxide but also contaminate the product.

For the most efficient operation of the process, it is preferred to pass the ozone along the longitudinal axis of the reactor and to feed a mixture of $NO_2$ and $ClO_2$ so as to produce reaction in the throat of the reactor, substantially as shown in FIGURE 1.

The dimensions and angles of the cones of the reactor are not critical. We have found that a reactor of the configuration shown in FIGURE 1, having an inlet cone of 15° and an outlet cone of 7° and sized in accordance with the desired scale of production, produces efficient reaction. A particular advantage in the use of the type of reactor described is that the the dimensions can be varied and scaled up without any substantial variation in its operating characteristics.

The ozone used can be made by ozoning dry oxygen but it is more convenient to ozonize dry air, since such practice eliminates the necessity for recycling of large volumes of gas in order to achieve economical operation. The relatively low concentrations of ozone thus produced, varying between about 0.1 and 1.25 wt. percent where air is ozonized and 0.1 and 2.5 wt. percent if oxygen is used, are entirely suitable for the practice of our invention. When such concentrations of ozone in air or oxygen are used, comparatively large volumes of gas are fed, and the increased flow rate through the reactor which results also aids in providing mixing of the reactants. Similarly, $ClO_2$ is generally stabilized by carrying it in a stream of diluent gas such as air or nitrogen; 10 percent $ClO_2$ in air is a commonly used mixture. When about stoichiometric ratios of the reactants are used in the concentrations of carrier gases mentioned, the volume ratio of ozone in air to $NO_2$ and $ClO_2$ in air is about 10 to 1, and this ratio has been found to produce efficient reaction.

Carrying out the process in accordance with the method described herein produces high yields of nitronium percholorate. For example, when an excess of the other reactants are used, yields of about 90 to 95% based on the ozone fed are achieved. In large scale commercial practice, the ozone is the most expensive reactant and therefore high yields based on this reactant are extremely desirable. Similarly, by adjustment of the flow rates so as to provide sufficient ozone and chlorine dioxide, yields up to 95% based on nitrogen dioxide can also be obtained. The yields based on chlorine dioxide generally are slightly lower, but are considerably higher than could be obtained heretofore, generally varying between about 50 and 80 percent, with yields of up to 95% being obtainable by proper adjustment of conditions.

An extremely pure product is produced in our process. In production runs at optimum conditions, products having purities of 99% and over have been routinely achieved. Furthermore, the nitronium perchlorate as produced by our method has attractive physical properties, for example, it is a pure white crystalline solid.

In a series of runs demonstrating the method and practice of our invention, nitronium perchlorate was produced by carrying out the reaction of ozone, nitrogen dioxide and chlorine dioxide in a Venturi tube reactor, essentially like that shown in the drawing, which was three inches long and had ⅛ inch inlet and outlet and a ¹⁄₁₆ inch throat.

A 0.75 to 1.25 percent mixture of ozone in air was produced by ozonizing air in a commercial ozonator and was mixed and reacted with the nitrogen dioxide and a 10% mixture of chlorine dioxide in air in the throat of the reactor. The product was collected in a dust bag collector. The examples given below in Table I show the data obtained from several runs carried out in this manner; these runs illustrate the variation in yields resulting from various feed ratio combinations.

Table I

| Run No. | Time, hrs. | Feed | | | Product, g. | Yield Based on— | | |
|---|---|---|---|---|---|---|---|---|
| | | $O_3$, g./hr. | $NO_2$, g./hr. | $ClO_2$, g./hr. | | $O_3$, percent | $NO_2$, percent | $ClO_2$, percent |
| 13 | 5.5 | 15 | 11.5 | 19.6 | 120 | 96 | 60 | 52 |
| 22 | 7.0 | 17 | 9.0 | 21 | 145 | 80 | 70 | 52 |
| 23 | 6.5 | 14.6 | 8.2 | 14.6 | 132 | 92 | 78 | 65 |
| 25 | 4.75 | 16.5 | 7.2 | 25 | 114 | 96 | 100 | 45 |
| 36 | 6.75 | 19 | 9 | 27.5 | 169 | 87 | 88 | 42 |
| 39 | 2.5 | 18.5 | 9 | 14 | 50 | 71 | 70 | 66 |
| 42 | 5.0 | 18.5 | 9 | 20 | 119 | 84 | 84 | 55 |
| 49 | 6 | 16.3 | 6 | 12 | 113 | 77 | 100 | 74 |
| 57 | 4.5 | 17.6 | 5.25 | 20.5 | 100 | 89 | 100 | 53 |
| 60 | 2.5 | 17.5 | 5.5 | 12.8 | 49 | 75 | 100 | 70 |

The purity of the nitronium perchlorate produced in these runs averaged about 96 to 99%.

In these and other tests it has been shown that the use of the Venturi tube reactor, and using a feed of ozone separate from that of nitrogen dioxide and chlorine dioxide, results in rapid and efficient production of highly pure nitronium perchlorate.

The nitronium perchlorate produced in the aforesaid manner is in the form of fluffy white crystals of extremely small particle size. The material as produced is composed mainly of particles of less than 2 microns, and less than 1 percent of the particles are over about 14 microns in size. While such small-sized product has certain advantages and is preferred for some applications, it is generally more desirable to have the nitronium perchlorate in larger size crystals. We have found that the particle size of the product can be greatly increased by carrying out the reaction in two Venturi tube reactors in series.

Figure 2:
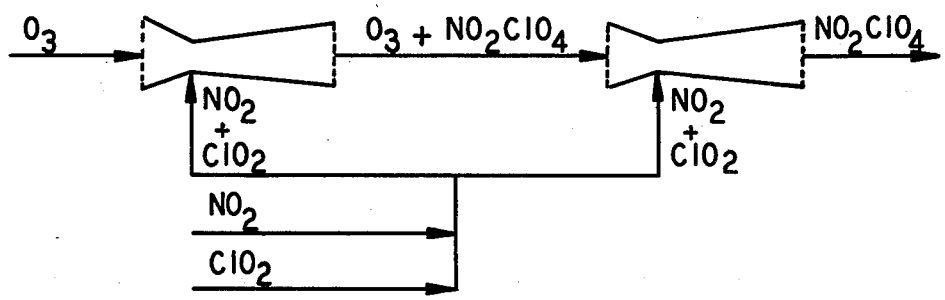

FIGURE 2 of the drawing shows schematically the manner in which this embodiment of the invention is carried out. As shown, the ozone stream is fed into the first reactor and part of the nitrogen dioxide and chlorine dioxide to be used is mixed with the ozone in the throat of the first reactor. Since the amount of nitrogen and chlorine dioxides fed into the first reactor is not sufficient to react with all the ozone, the effluent stream from the first reactor contains the remaining ozone along with the small nitronium perchlorate particles produced. This stream is then fed into the second reactor where the remainder of the nitrogen dioxide and chlorine dioxide is mixed and reacted with the remaining ozone in the throat of the second reactor. The product is collected in the usual manner.

While the particle size of the product is increased to some extent whatever the proportion of oxides which is fed to the first reactor, we have found that to obtain larger sized crystals it is more desirable to feed a relatively small part of the nitrogen and chlorine dioxides into the first reactor, i.e., about 1 to 20 percent into the first reactor and the remainder into the second reactor. Reactions carried out in accordance with the description and conditions set forth in the examples given in Table I above, but using two reactors instead of one, produced nitronium perchorate of large crystal size, i.e., up to 200 microns. Pertinent data from several runs carried out in this manner, each of which produced substantially large particle sized product, are shown in Table II. In these reactions, about 10% of the nitrogen and chlorine dioxides was fed into the first reactor and the remainder into the second reactor.

Table II

| Run No. | Time, hrs. | Feed | | | Product, g. | Yield Based on— | | |
|---|---|---|---|---|---|---|---|---|
| | | $O_3$, g./hr. | $NO_2$, g./hr. | $ClO_2$, g./hr. | | $O_3$, percent | $NO_2$, percent | $ClO_2$, percent |
| 62 | 5.0 | 22.6 | 7 | 13.2 | 113 | 70 | 100 | 80 |
| 63 | 5.25 | 21.5 | 7 | 11 | 122 | 75 | 100 | 90 |

Nitronium perchlorate is hygroscopic and thus moisture should be avoided as much as posssible in carrying out our process for its production. Towards this end, it is necessary to dry the gas streams entering the reactor and to prevent access by atmospheric moisture to the nitronium perchlorate produced by collecting and storing the product in closed containers and an inert gas atmosphere.

Hydrolysis of nitronium perchlorate, i.e., reaction with water, produces nitric acid and perchloric acid; thus, nitronium perchlorate is useful as a laboratory source of perchloric acid, which is ordinarily difficult to obtain and store. Nitronium perchlorate is also useful in propellant applications where it is used as an oxidizer in conjunction with a fuel. In such applications, it is used in the same manner and in similar formulations as is the well known oxidizer ammonium perchlorate.

According to the provision of the patent statutes, we have explained the principle and mode of practicing our invention and have described what we now consider to be its best embodiments. However, we desire to have it understood that, within the scope of the appended claims the invention may be practiced otherwise than as specifically described.

We claim:

1. A method for the production of nitronium perchlorate, $NO_2ClO_4$, which comprises mixing and reacting nitrogen dioxide, $NO_2$, chlorine dioxide, $ClO_2$, and ozone in the throat of a Venturi tube reactor, said ozone being introduced into the reaction zone separately from the other reactants.

2. A method for the production of nitronium perchlorate, $NO_2ClO_4$, which comprises mixing and reacting nitrogen dioxide, $NO_2$, chlorine dioxide, $ClO_2$, and ozone in a Venturi tube reactor, said ozone being introduced into the reaction zone separately from the other reactants, the flow of said ozone being along the longitudinal axis of said reactor and said nitrogen dioxide and chlorine dioxide being mixed with said ozone in the throat of said reactor.

3. A method in accordance with claim 2 in which the said ozone is carried in a stream of air, the concentration of ozone in the air being between about 0.1 and 2.5 percent by weight.

4. A method of producing nitronium perchlorate which comprises passing ozone into a first Venturi tube reactor; mixing and reacting nitrogen dioxide and chlorine dioxide with the said ozone, said ozone being introduced into the reaction zone separately from the other reactants and the amount of said nitrogen dioxide and said chlorine dioxide being less than would be required to react with all the ozone; passing the effluent stream from said first reactor into a second Venturi tube reactor; mixing and reacting additional nitrogen dioxide and chlorine dioxide with the said stream in the throat of said second reactor; and recovering the nitronium perchlorate thus produced.

5. A method in accordance with claim 4 in which about 1 to 20 percent of the amount of nitrogen dioxide and chlorine dioxide necessary for reaction with all the ozone is fed into the first reactor, and the remainder is fed to the second reactor.

6. A method in accordance with claim 4 in which the ozone is carried in a stream of air, the concentration of ozone in the air being between about 0.1 and 2 percent by weight.

7. A method in accordance with claim 1 in which said ozone is carried in a stream of oxygen.

8. A method in accordance with claim 4 in which said ozone is carried in a stream of oxygen.

References Cited by the Examiner
UNITED STATES PATENTS 2,623,811  12/52  Williams _____ 23—209.8
2,851,337  9/58   Heller _____ 23—209.4

OTHER REFERENCES

Gordon et al.: "Conadian J. Of Research" vol. 18B, pp. 358–362 (1940).

Schumacher: "Perchlorates," pp. 60, 61, 69, 70, ACS Monograph Series No. 146, Reinhold Publ. Co., N.Y.C., 1960.

MAURICE A. BRINDISI, *Primary Examiner.*

ROGER L. CAMPBELL, *Examiner.*